(12) United States Patent
Shoda

(10) Patent No.: US 7,679,796 B2
(45) Date of Patent: Mar. 16, 2010

(54) IMAGE PROCESSING APPARATUS AND IMAGE PROCESSING METHOD

(75) Inventor: Hirokazu Shoda, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 476 days.

(21) Appl. No.: 11/670,712

(22) Filed: Feb. 2, 2007

(65) Prior Publication Data

US 2008/0186518 A1 Aug. 7, 2008

(51) Int. Cl.
G03F 3/08 (2006.01)
H04N 1/40 (2006.01)
G06K 9/00 (2006.01)
G06K 9/18 (2006.01)

(52) U.S. Cl. .................. 358/518; 358/2.1; 358/520; 382/165; 382/182

(58) Field of Classification Search .................. None
See application file for complete search history.

(56) References Cited

U.S. PATENT DOCUMENTS

2001/0053248 A1* 12/2001 Maeda .................. 382/165
2003/0235334 A1* 12/2003 Okubo .................. 382/182
2007/0253040 A1* 11/2007 Lee et al. .................. 358/518

FOREIGN PATENT DOCUMENTS

| JP | 11-187266 | 7/1999 |
| JP | 11-341280 | 12/1999 |
| JP | 2003-309725 | 10/2003 |

* cited by examiner

Primary Examiner—Twyler L Haskins
Assistant Examiner—Barbara D Reinier
(74) Attorney, Agent, or Firm—Turocy & Watson, LLP

(57) ABSTRACT

To provide an image processing apparatus that does not cause missing of characters in a case where a monochrome copy is made by reading a color original document even when the base and characters thereon have the same reflectance as long as they have different hues.

An image processing apparatus of the invention includes a background color specifying portion 54D that specifies a background color using RGB signals outputted from a scanner portion 120, a hue determination portion 54C that determines the hue of a pixel of interest, and a monochrome signal generation processing portion 55 that generates a monochrome signal using any one of the RGB signals according to a specification result of the background color specifying portion and a determination result of the hue determination portion.

16 Claims, 16 Drawing Sheets

LINE SENSORS B, G, R: EACH HAVING 7500 PIXELS

SPECTRAL SENSITIVITY CHARACTERISTICS OF LINE SENSORS R, G, B

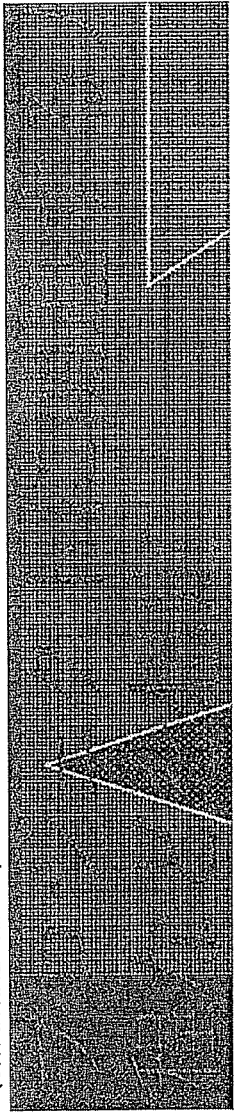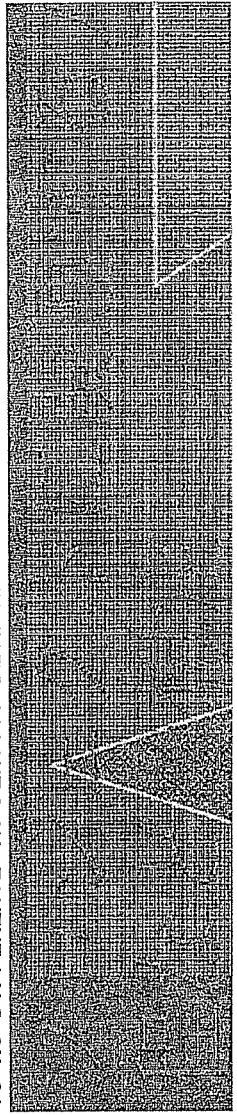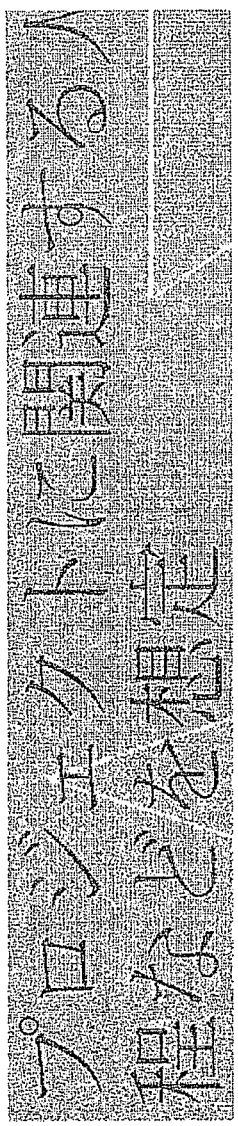
FIG.16(a) (ORIGINAL IMAGE)
FIG.16(b) (MONOCHROME IMAGE IN RELATED ART)···VISIBILITY IS DETERIORATED BECAUSE THERE IS NO DIFFERENCE IN DENSITY BETWEEN RED CHARACTERS AND BLUE BACKGROUND
FIG.16(c) (MONOCHROME IMAGE OF THE INVENTION)···VISIBILITY IS SATISFACTORY BECAUSE THERE IS DIFFERENCE IN DENSITY BETWEEN READ CHARACTERS AND BLUE BACKGROUND

IMAGE PROCESSING APPARATUS AND IMAGE PROCESSING METHOD

BACKGROUND OF THE INVENTION

1. Field of the Invention

The present invention relates to an image processing apparatus and an image processing method used for a scanner, a digital copying machine, and the like that read image information by scanning an original document with a CCD line sensor.

2. Description of the Related Art

As typical examples of a CCD line sensor used in a reducing optical system, there are a line sensor comprising a I-line line sensor, and a sensor comprising a 3-line line sensor formed of three line sensors on the surfaces of which are respectively disposed color filters in red (hereinafter, occasionally abbreviated to R), green (hereinafter, occasionally abbreviated to G), and blue (hereinafter, occasionally abbreviated to B).

The 1-line CCD line sensor is basically used to read a monochrome original document. When a color original document is read using the 1-line CCD line sensor, an adopted method is to provide three light sources having spectral characteristics of R, G, and B, which are three primary colors of light, so as to read image information of a color original document by separating the image information into color information of R, G, and B by sequentially lighting ON these light sources. There is another method by which a light source having the spectral characteristic of white is used, and color filters in R, G, and B are disposed in the optical path between the light source and the line sensor, so that color information going incident on the line sensor is separated by switching the color filters.

Meanwhile, the 3-line CCD line sensor is basically used to read a color original document. In this case, a light source having oscillation wavelengths of 400 nm to 700 nm and thereby having spectral characteristics that sufficiently cover a visible light region is used, and separation of color information of R, G, and B is performed using the color filters disposed on the surfaces of the respective line sensors.

In addition, in a case where a monochrome original document is read using the 3-line CCD line sensor, there are a method by which one output from the 3-line CCD line sensor, that is, an output of the CCD line sensor for G in general, is used with the purpose of reading a seal in vermillion in a reliable manner, and a method by which black and white information is generated using all the outputs of the 3-line CCD line sensor.

However, the methods in the related art for reading a color original document in a monochrome state possibly have inconveniences as follows. For example, in a case where a color original document is read by a typical monochrome scanner using a line sensor on the light-receiving surface of which is disposed no color filter, reflected light from the original document goes incident on the line sensor, which makes it possible to read a variance in luminance but makes it impossible to read information about colors. Hence, in a case where an original document is made of red characters on the base of blue, although it is affected by the spectral characteristic of the light source, blue and red cannot be distinguished from each other when the reflectance is the same, and they are handled as the same signal. This gives rise missing of information when a color original document is read by the monochrome scanner. When a copying operation to make print on a sheet of paper is performed using such a signal, there is a problem that missing of characters, an image, or the like occurs.

In addition, in a case where a color original document is copied in monochrome using the 3-line CCD line sensor formed of three CCD line sensors on the surfaces of which are respectively disposed color filters in red, green and blue, there may be a case, for example, where the color of characters and the color of the base become the same depending on the colors of the color original document, which gives rise to missing of information on the original document. In the case of a scanner, because image information is read by forming the image of reflected light from the original document on each line sensor, color information is reproduced in red, blue, and green, which are the three primary colors of light.

Further, there is a method by which a pseudo achromatic color is generated by adding up the wavelength regions of red, blue, and green, which are the color filters on the line sensors. In this case, it is possible to calculate monochrome information=(red information+blue information+green information)/3.

However, when this processing is used, for example, in a case where information is made of red characters on the base in blue, given that the outputs of the respective line sensors when reading the blue information of the base are (red:blue:green)=(0:255:0), and the outputs of the respective line sensors when reading the red character information are (red:blue:green)=(255:0:0), then, (0+255+0)/3=85 when the blue base information is converted to monochrome, and (255+0+0)/3=85 when the red character information is converted to monochrome.

It is therefore understood that when such a color original document is copied in monochrome, the signals become the same color.

Likewise, because the information having the same addition result of red, blue, and green is deemed as the same information, even the information having different balances (chromaticity) among red, blue, and green is handled as a signal for a copy in monochrome. Hence, when a color original document is copied in monochrome, there is a problem that missing of characters or an image occurs.

Similar techniques are disclosed in Official Gazette (A) JP-A-2003-274115 and Official Gazette (B) JP-A-11-187266. Official Gazette (A) describes a reading device using a 4-line line sensor but is silent about a correction of a monochrome signal using a color signal. Official Gazette (B) discloses a base removing method. However, it is configured so as to perform a density correction for RGB signals, and is different from the technique of the invention.

SUMMARY OF THE INVENTION

The invention was devised to solve the problems discussed above, and therefore has an object to provide an image processing apparatus and an image processing method for enabling an output of a high-quality image in which missing of neither characters nor an image occurs by specifying the background color and generating a monochrome signal using any one of RGB signals in a case where a monochrome copying is performed by reading a color original document even when the base and characters or an image thereon have the same reflectance.

In order to achieve the above and the other objects, an image processing apparatus of the invention includes: a background color specifying unit configured to specify a background color of an original document using RGB signals of image data acquired by reading the original document; a hue determination unit configured to determine a hue of a pixel in the image data; and a monochrome signal generation processing unit configured to generate a monochrome signal using at least one of the RGB signals according to a specification result of the background color specifying unit and a determination result of the hue determination unit.

Another image processing apparatus of the invention includes: background color specifying means for specifying a background color of an original document using RGB signals of image data acquired by reading the original document; hue determination means for determining a hue of a pixel in the image data; and monochrome signal generation processing means for generating a monochrome signal using at least one of the RGB signals according to a specification result of the background color specifying means and a determination result of the hue determination means.

In addition, the invention is an image processing method performed by a computer in an image processing apparatus, including the steps of: specifying a background color of an original document using RGB signals of image data acquired by reading the original document; determining a hue of a pixel in the image data; and generating a monochrome signal using at least one of the RGB signals according to a specification result in the step of specifying the background color and a determination result in the step of determining the hue.

BRIEF DESCRIPTION OF THE DRAWINGS

FIG. 16A is a view showing an original color image read for the image processing, FIG. 16B is a view showing a result of printing by the image processing in the related art, and FIG. 16C is a view showing the result of printing by the image processing according to one embodiment of the invention.

DESCRIPTION OF THE EMBODIMENTS

Hereinafter, one embodiment of the invention will be described with reference to the drawings.

Figure 1:
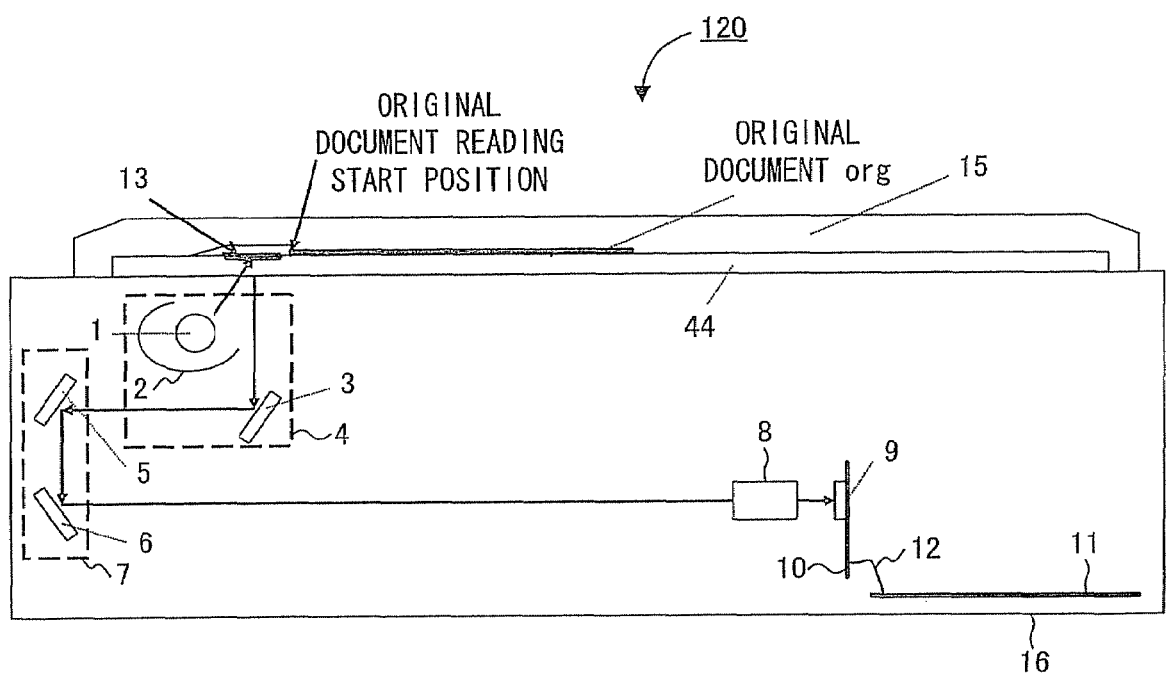
FIG. 1 is a side view schematically showing the configuration of an image reading device according to one embodiment of the invention.

FIG. 1 shows the configuration of an image reading device according to one embodiment of the invention. In this image reading device (image reading portion described below) 120, an original document org is placed face down on a document glass plate 44. When a document fixing cover 15 provided to be free to open and close is closed, the original document org is pressed on the document glass plate 44. The original document org is irradiated by a light source 1, and reflected light from the original document org passes by a first mirror 3, a second mirror 5, a third mirror 6, and a collective lens 8 and reaches the sensor plane of a CCD line sensor 9 mounted on a CCD sensor substrate 10 to form an image thereon. Regarding the original document org, light irradiated from the light source 1 is scanned on the original document org as a first carriage 4 composed of the light source 1 and the first mirror 3 and a second carriage 7 composed of the second mirror 5 and the third mirror 6 are moved by an unillustrated carriage driving motor. In this case, because the moving velocity of the first carriage 4 is set twice as high as the moving velocity of the second carriage 7 for the movements of the first and second carriages, the optical path from the original document org to the CCD line sensor 9 is controlled to stay at a constant length.

The original document org placed on the document glass plate 44 in this manner is read successively line by line, and is converted to an analog electric signal corresponding to the strength of a light signal, which is reflected light, by the CCD line sensor 9. The converted analog electric signal is then converted to a digital signal and delivered via a harness 12 to a control substrate 11 that handles a control signal related to the CCD sensor. In the control substrate 11, digital signal processing, such as shading (distortion) correction to correct a low-frequency distortion caused by the collective lens 8 and a high-frequency distortion resulting from a variance in sensitivity of the CCD line sensor 9, is performed. It should be noted that the processing to convert the analog electric signal to the digital signal described above can be performed in the CCD sensor substrate 10 or in the control substrate 11 connected thereto via the harness 12.

When the shading processing descried above is performed, a signal used as the reference for black and a signal used as the reference for white are necessary. Herein, assume that the former black reference signal is an output signal of the CCD line sensor 9 in a state where the CCD line sensor 9 is not irradiated by light while the light source 1 is lit OFF, and the latter white reference signal is an output signal of the CCD line sensor 9 when a white reference plate 13 is read while the light source 1 is lit ON. When these reference signals are generated, signals for more than one line are averaged in general in order to reduce the influences of a singular point and a quantization error.

Figure 2:
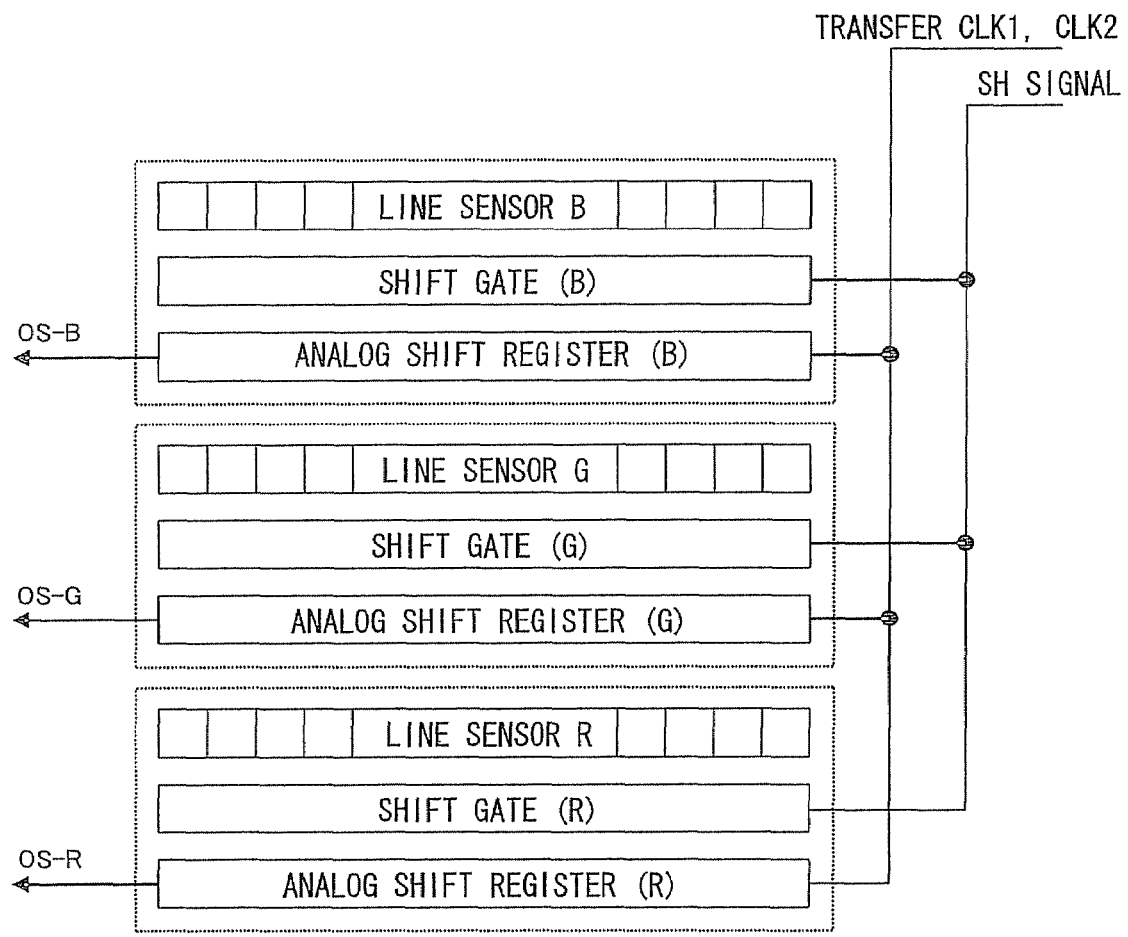
FIG. 2 is a view used to describe the configuration of line sensors in the image reading device of FIG. 1.

The configuration and operations of the CCD line sensor shown in FIG. 1 will now be described with reference to FIG. 2 and FIG. 3. FIG. 2 is a view schematically showing the configuration of a 3-line CCD sensor as one example of this embodiment composed of three line sensors on the light-receiving surfaces of which are respectively disposed color filters in blue, green, and red (hereinafter, abbreviated to B, G, and R, respectively), that is, a line sensor B, a line sensor G, and a line sensor R. The line sensors B, G, and R are formed of photo diode arrays and perform photoelectric conversion operations.

For example, in the case of an A4-size original document, the original document org has an area of 297 mm in the longitudinal direction and 210 mm in the transverse direction. In a case where an original document reading operation is performed by defining the longitudinal direction as the main scanning direction and the transverse direction as the sub-scanning direction, at least 7016 pixels are necessary as the effective pixels in the photo diode arrays in the CCD line sensor 9. Generally, a sensor having 7500 pixels is used. In addition, as is shown in FIG. 3, the CCD line sensor has a light shield pixel portion shielded against light by aluminum or the like in part of the photo diode array to prevent light from coming incident on the preceding stage of 7500 pixels as the effective pixels, and dummy pixel portions and empty transmission portions before and after the effective pixels. Hence, in order to output all the charges accumulated in the CCD line sensor, transfer CLK's in number exceeding the 7500 pixels are necessary. Herein, assume that a total of the light shield pixel portion, the empty transmission portions, and the dummy pixel portions outside of the effective pixel region is comparable to 500 transfer CLK's. Then, in order to output all the charges accumulated in one line of the CCD line sensor to the outside of the CCD line sensor, a time comparable to 8000 transfer CLK's is necessary, and this time is found to be a light accumulation time (tINT) for one line.

In addition, as the characteristic of the output signal of the CCD line sensor, a signal is outputted in reference to a voltage level to which a specific offset is assigned with respect to the electric reference level (GND). This voltage level used as the reference is referred to as the signal output direct current voltage (offset level: Vos). Light energy irradiated to the line sensor when an SH signal within the 1-line light accumulation time (tINT) shown in FIG. 3 is at the "L" level is accumulated in the photo diode as charges, and when the SH signal is at the "H" level, the accumulated charges pass through the shift gate adjacent to the photo diode and are further transferred to the adjacent analog shift register. When this transfer operation ends, the SH signal is shifted to the "L" level to operate the shift gate for a charge accumulation operation to be performed again in the photo diode while preventing charges from leaking to the outside of the photo diode.

The charges transferred to the analog shift register are transferred to the outside in cycles of the transfer CLK by the unit of pixel. Because of this operation, application is performed with the SH signal so as to suspend the transfer CLK during a period in which charges are migrating from the photo diode to the analog shift register by passing through the shift gate (see FIG. 3). Even in a case where the transfer CLK is inputted constantly and the transfer CLK is suspended correspondingly to the SH signal inside the CCD line sensor, the charge transfer operation in the inside is the same. There is a case where the polarities of the SH signal and the transfer CLK are different from those in FIG. 3 depending on the CCD line sensors; however, the operation inside the sensor is the same.

The time comparable to 8000 transfer CLK's described above is described not as the number of CLK's but as the time regardless of the transfer CLK suspending state at the time of SH signal. For example, given an image transfer frequency f=20 MHz for a 4-line CCD sensor, then, in order to output all the charges accumulated in one line of the line sensor CCD to the outside, a time calculated as:

$$8000 (CLK's) \times (1/20 \text{ MHz}) = 400 \text{ } \mu s$$

is necessary, and this time is found to be the light accumulation time of the line sensor for one line in the sub-scanning direction.

Hereinafter, the relation with the analog signal amplitude outputted from the line CCD sensor 9 will be described on the assumption that the frequency of the transfer CLK (cycle t0) is 20 MHz and the 1-line light accumulation time tINT is 400 µs. However, it goes without saying that these transfer CLK frequency and 1-line light accumulation time vary with the specifications of the products.

Figure 4:
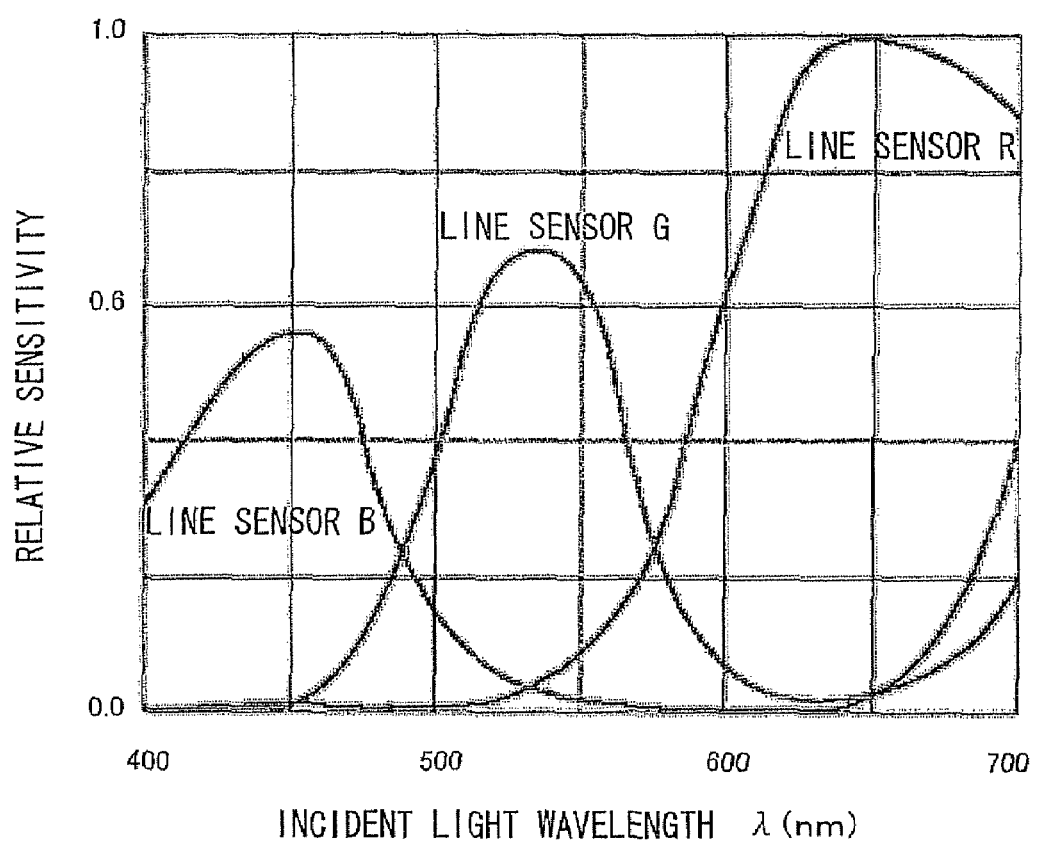
FIG. 4 is a graph showing relative sensitivities of line sensors R, G, and B shown in FIG. 2 with respect to the wavelength of incident light.
Figure 5:
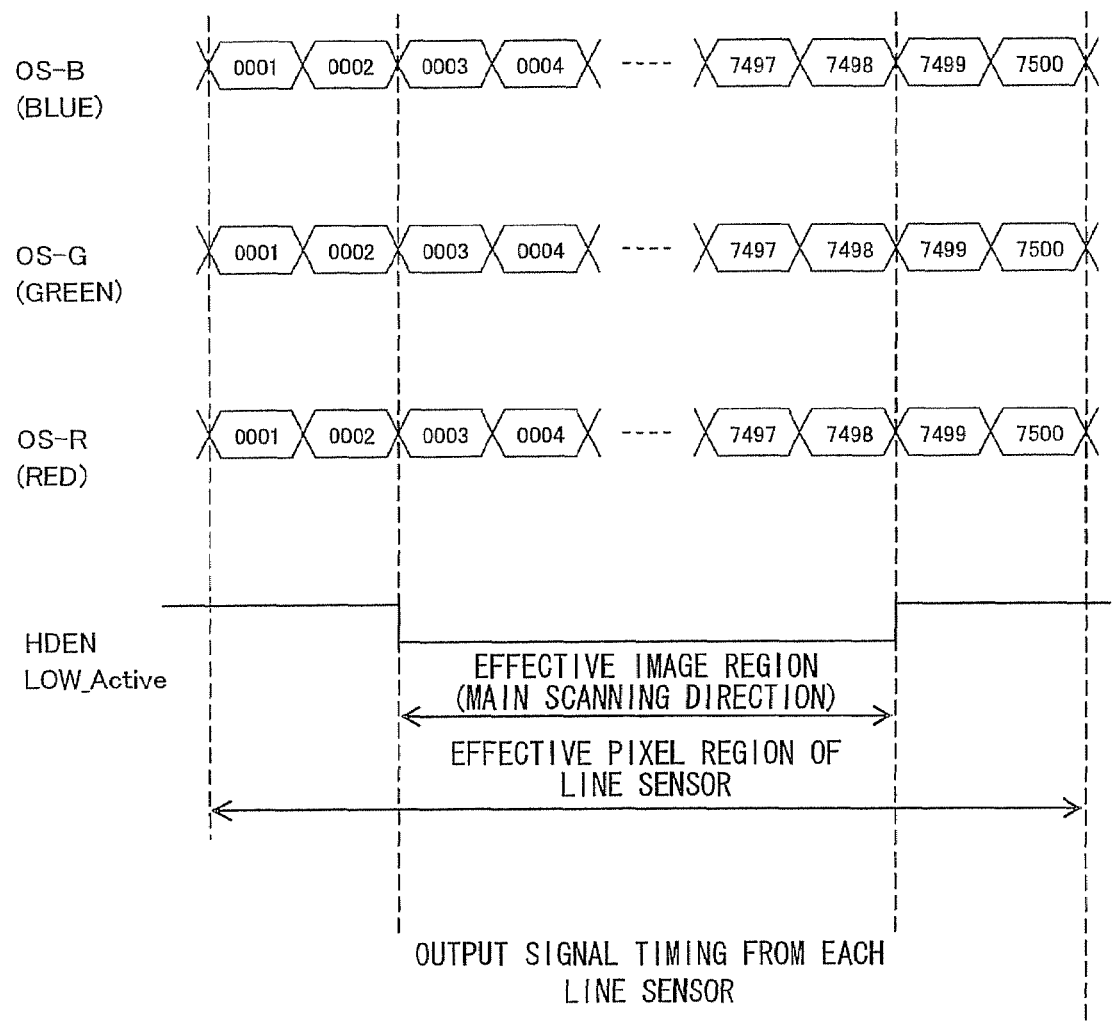
FIG. 5 is a time chart used to describe timing of output signals from the line sensors R, G, and B of FIG. 2.
Figure 6:
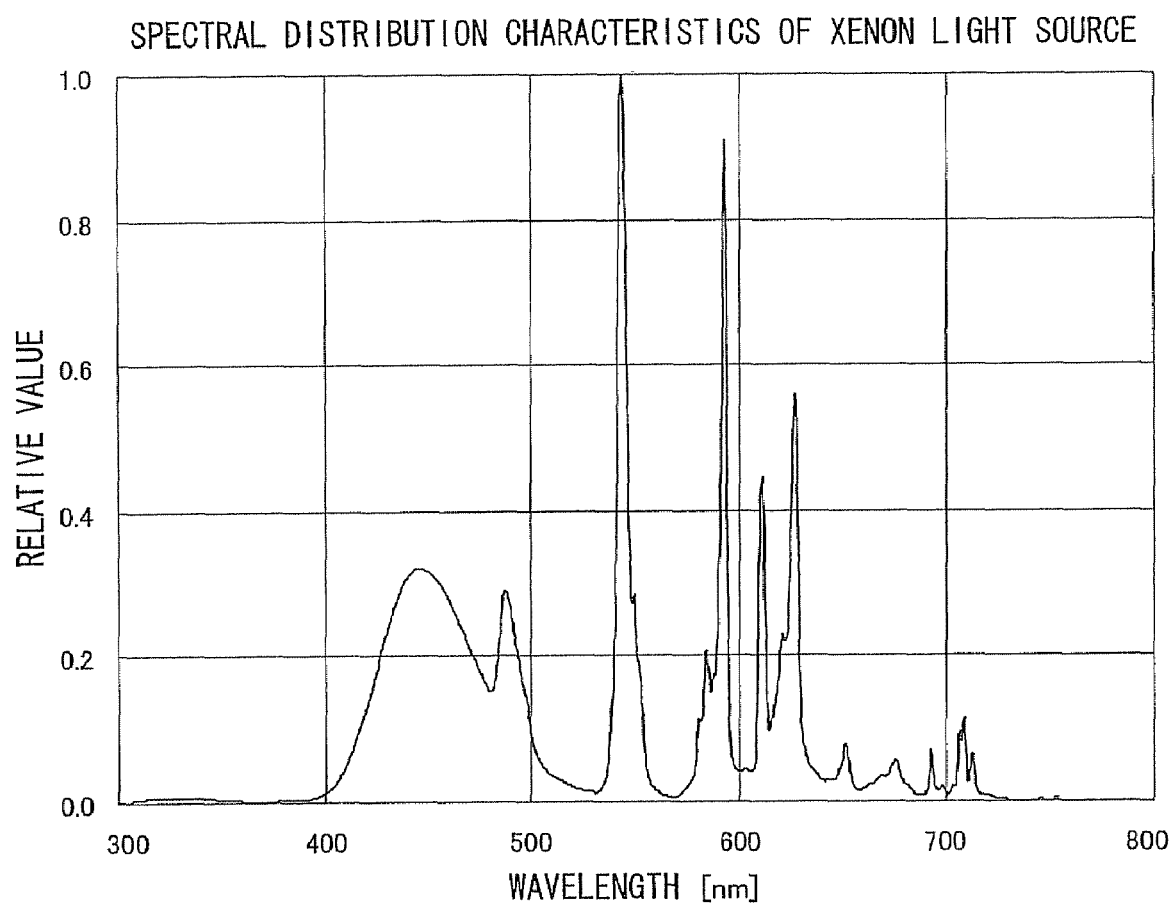
FIG. 6 is a graph showing the spectral distribution characteristic of a xenon light source.

FIG. 4 shows the spectral sensitivity characteristics of the CCD line sensors R, G, and B. As has been described, the CCD line sensor 9 is formed of the line sensors R, G, and B on which the color filters are disposed. In a case where light from the light source is irradiated uniformly to these line sensors, the line sensor R, the line sensor G, or the line sensor B has sensitivity to wavelengths in a particular range. As is shown in FIG. 5, signals outputted from the CCD line sensor 9 are outputted in synchronization for B, G, and R. In addition, not the entire effective pixel region of the CCD line sensor 9 is used as an image, and of the entire region, pixels in the appropriate number for the read image are selected as the effective image region (the "L" level period of HDEN signal). For reference, one example of the spectral distribution of a xenon light source is shown in FIG. 6.

Figure 7A:
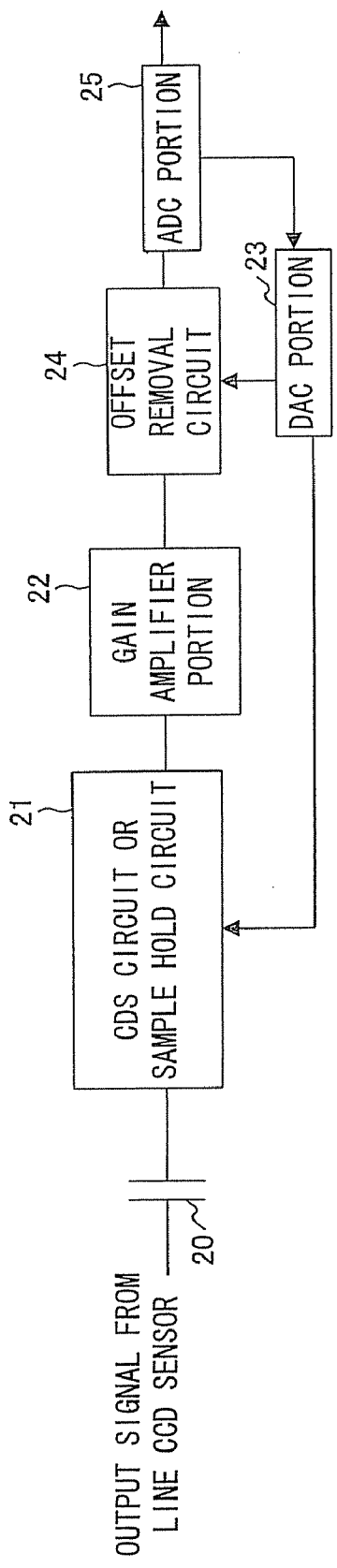
FIG. 7A is a block diagram showing an analog processing circuit that processes output signals of a CCD line sensor.
Figure 7B:
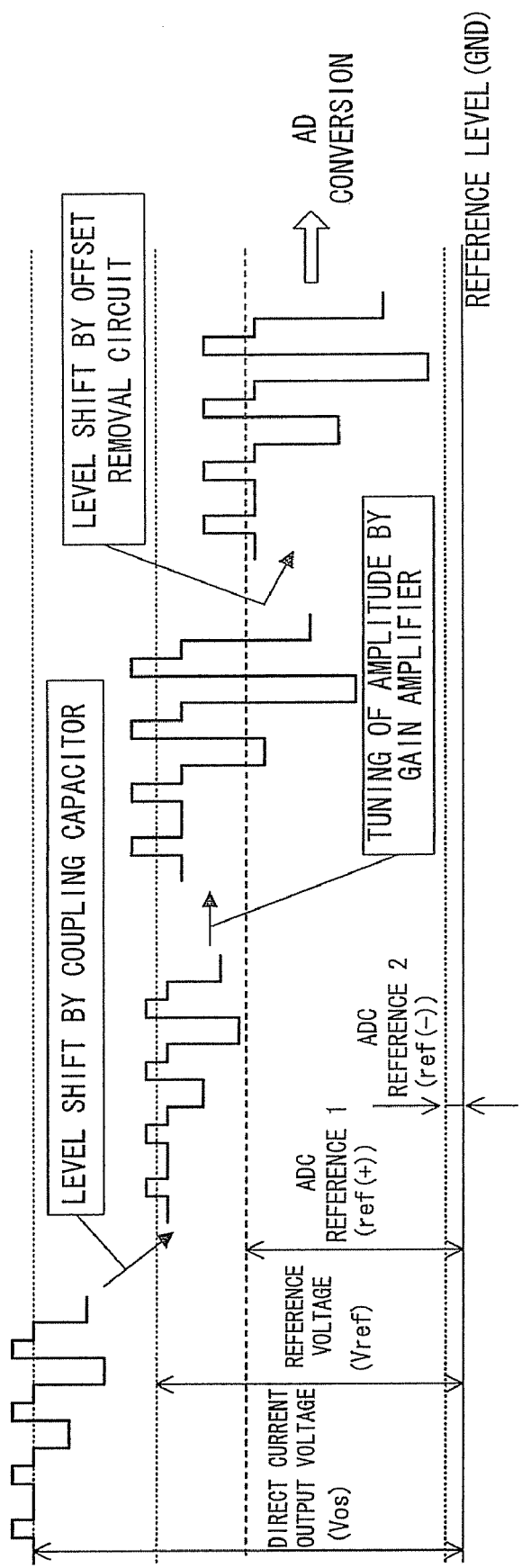
FIG. 7B is a time chart used to describe the processing by the circuits of FIG. 7A.

FIG. 7A is a block diagram schematically showing the configuration of an analog processing circuit for an analog signal outputted from the CCD line sensor 9. FIG. 7B is a time chart to describe the analog waveforms in the processing circuits shown in FIG. 7A. A various analog processing circuit 11C (see FIG. 8) for an analog signal outputted from the CCD line sensor 9 is generally formed of a coupling capacitor 20, a CDS (Correlated Double Sampling) circuit, which is a correlated double sampling circuit, or sample hold circuit 21, a gain amplifier portion 22, a DAC (Digital Analog Converter) portion 23 that converts a digital signal to an analog signal, an offset removing circuit 24 that removes a direct current component, and an ADC (Analog Digital Converter) portion 25 that converts an analog signal to a digital signal.

Concrete operations of the circuits of FIG. 7A will now be described using FIG. 7B. As is also shown in FIG. 3, an output signal from the CCD line sensor 9 is outputted in reference to the signal output direct current voltage (Vos). The signal output direct current voltage (Vos) varies with the CCD line sensor 9, and in the case of a CCD line sensor using a +12 V power supply, it has a variance of about 3 to 8 V. The coupling capacitor 20 is connected thereto in series with the purpose of removing the direct current component of a signal having this uncertain level. In this instance, for the processing of the CDS circuit or sampling circuit 21, processing to match the potential of the dummy pixel portions or the light shield portion shown in FIG. 3 to the reference potential (Vref) is performed.

Subsequently, processing to match the analog signal from the CCD line sensor, from which the direct current component has been removed, to the input range of the ADC portion 25 at the latter stage is performed. In this instance, a direct current voltage to match the direct current component to the input range is generated in the DAC portion 23, and the direct current component is tuned again by the CDS (Correlated Double Sampling) circuit, which is a correlated double sampling circuit, or sample hold circuit 21 and the offset removing circuit 24, so that the voltage of the light shield portion of the CCD sensor matches the direct current voltage.

As is shown in FIG. 7B, given ADC reference 1 (ref(+)) as the reference voltage on the "H" level side and ADC reference 2 (−) as the reference voltage on the "L" level side needed for the conversion in the ADC 25, then processing is performed for the signal to fall within this voltage range. In this instance, because the output of the ADC 25 saturates upon input of a signal that exceeds the ADC reference 1 (ref(+)) or drops below the ADC reference 2 (ref(−)), the signal is controlled so as not to go out of these references on any terms.

Figure 8:
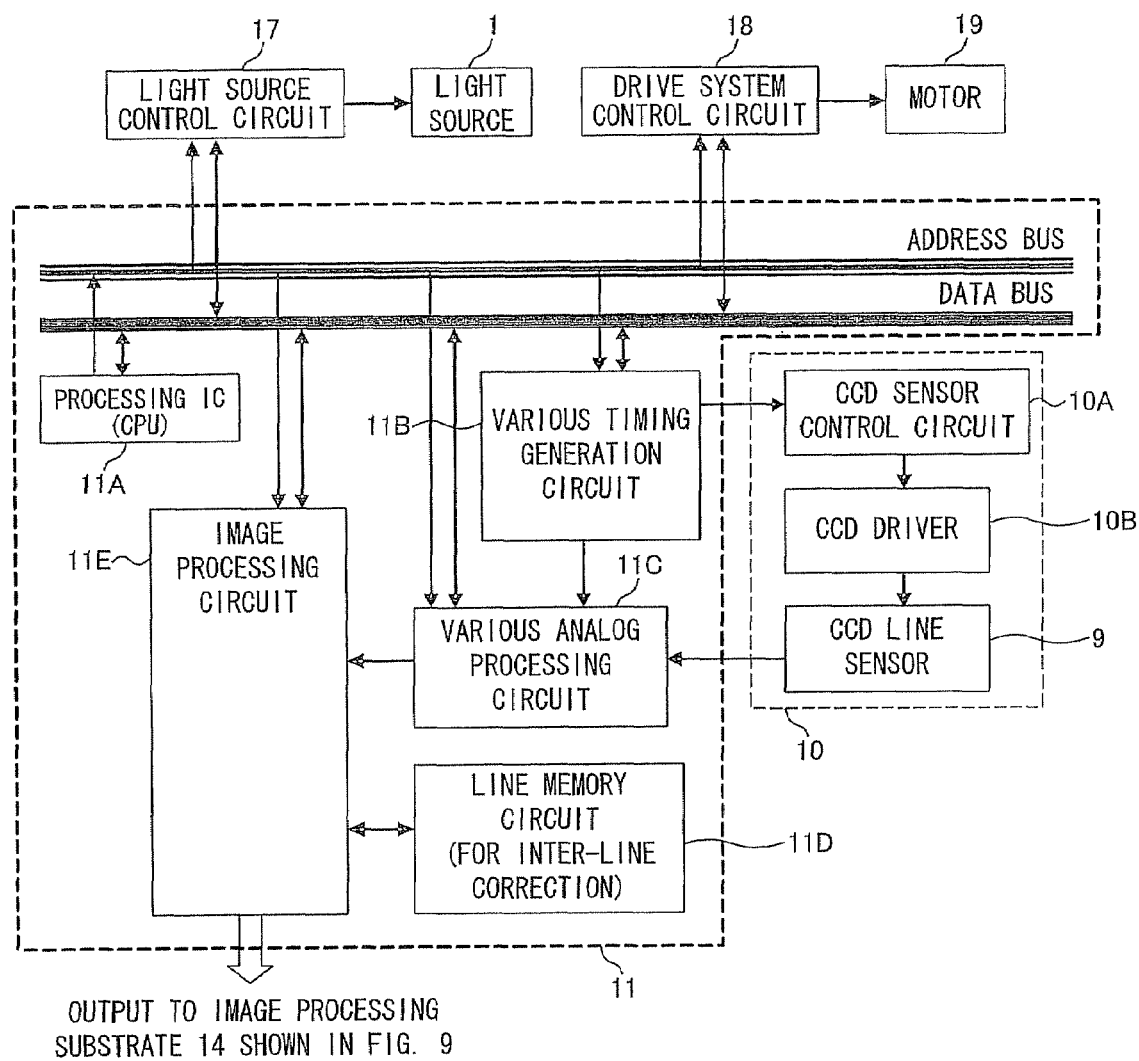
FIG. 8 is a block diagram showing in detail a CCD sensor substrate and a control substrate shown in FIG. 1.

FIG. 8 schematically shows the configuration of the control substrate 11 and the CCD sensor substrate 10 shown in FIG. 1. The control substrate 11 is formed of a processing IC (CPU) 11A, such as a CPU, a various timing generation circuit 11B, the various analog processing circuit 11C shown in FIG. 7A, a line memory circuit 11, and an image processing circuit 11E. The processing IC 11A not only controls a signal processing system of the CCD line sensor 9, but also controls a light source control circuit 17 that controls the light source 1 and a driving system control circuit 18 that controls a motor 19 for moving the first carriage 4 and the second carriage 7 using control signals of an address bus, a data bus, and the like.

Figure 3:
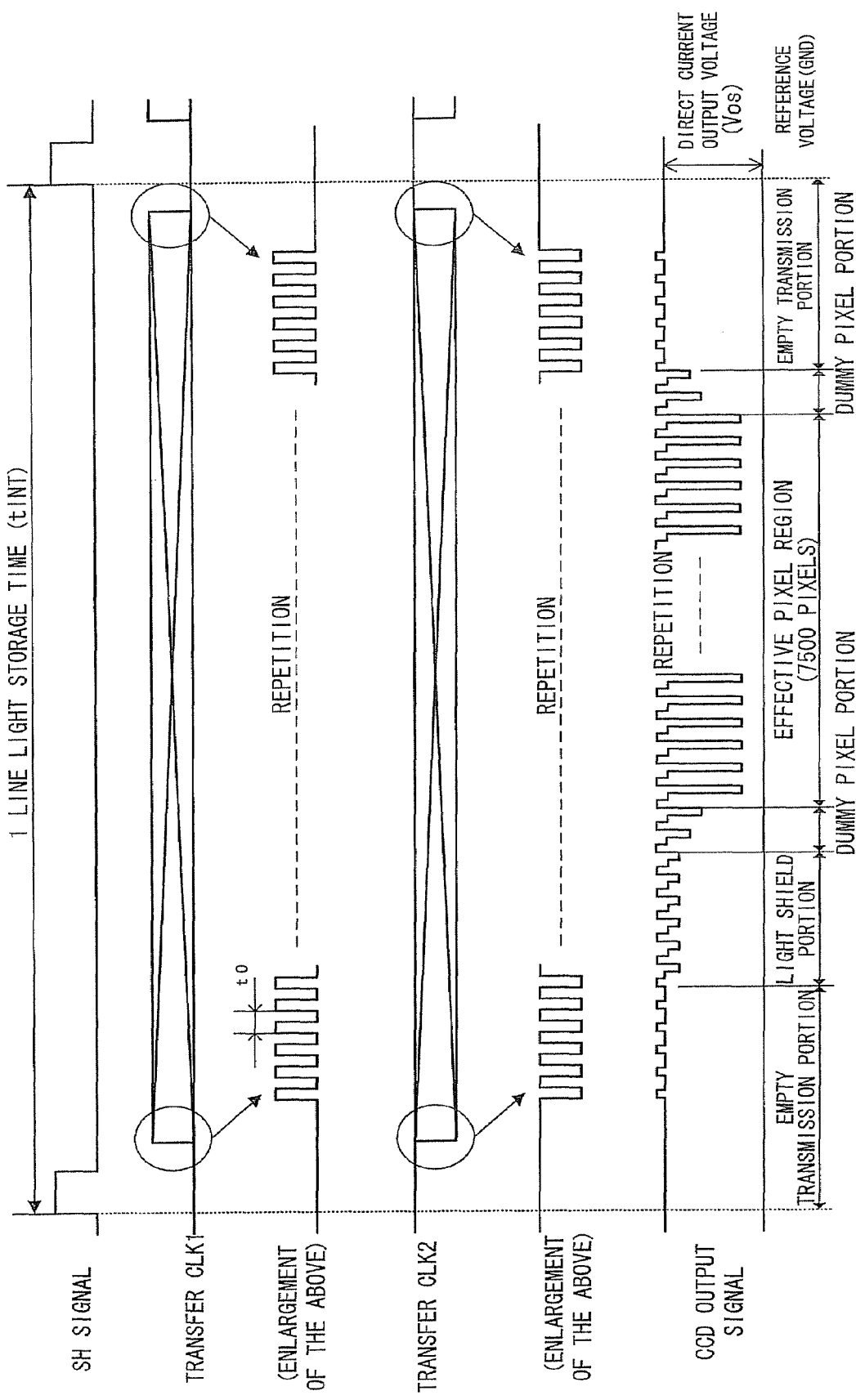
FIG. 3 is a time chart used to describe driving of the line sensors shown in FIG. 2.

The various timing generation circuit 11B generates signals necessary to drive the CCD line sensor 9, such as the SH signal and the transfer CLK's 1 and 2 shown in FIG. 3, and signals necessary for the various kinds of analog processing shown in FIG. 7A. For the signals necessary to drive the CCD line sensor 9 and generated in the various timing generation circuit 11B, timing is adjusted by a CCD sensor control circuit 10A, and they are inputted into the CCD line sensor 9 via a CCD driver 10B used for matching the signal amplitude levels or shaping the waveform. Herein, there will be no problem when the CCD sensor control circuit 10A is included in the various timing generation circuit 11B. An output from the CCD line sensor 9 is inputted into the various analog processing circuit 11C, and subjected to various kinds of analog processing by the circuits shown in FIG. 7A. In FIG. 8, the various analog processing circuit 11C is illustrated as a component of the control substrate 11. However, there will be no functional problem even when it is disposed on the CCD sensor substrate 10.

As is shown in FIG. 2, in the CCD line sensor 9, respective line sensors are disposed physically spaced apart, and this gives rise to displacement of the reading position among the respective line sensors. The reading position displacement is corrected by the line memory circuit 11D. In the image processing circuit 11E, not only the control of the line memory circuit 11D is performed, but also processing, such as the shading correction and the logarithmic transformation using an image signal converted to a digital signal, is performed. The RGB signals having undergone various kinds of processing are outputted to an image processing portion 14 incorporated into an image processing substrate shown in FIG. 9.

Figure 9:
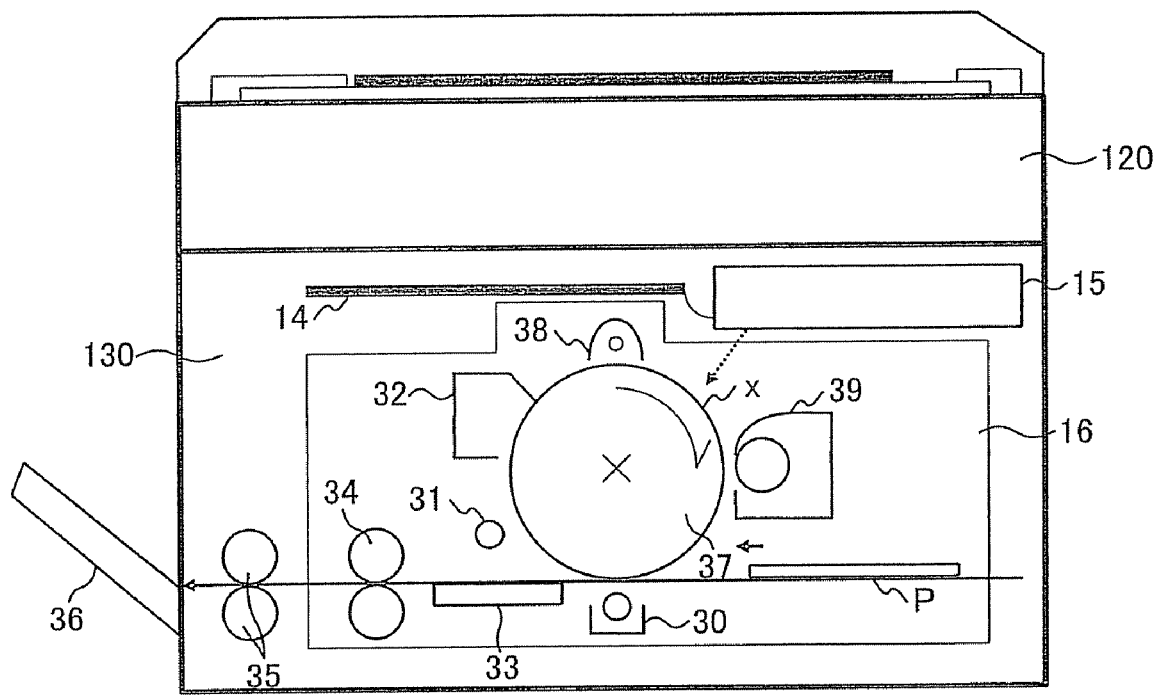
FIG. 9 is a view showing the configuration of a digital copying machine according to one embodiment of the invention.

FIG. 9 is a view schematically showing a digital copying machine formed of an image reading device (scanner portion) and a printer portion that forms an image on a sheet of paper. A printer portion 130 shown in FIG. 9 is illustrated as one example of the configuration to generate a monochrome image from an original document read by a scanner portion 120. The printer portion 130 is formed of the image processing portion 14 that performs processing necessary to form an image, for example, the filter processing and the tone processing, to image data read by the CCD line sensor 9 in the scanner portion 120 so as to be converted into a control signal of an unillustrated light-emitting element, such as a semiconductor laser, a laser optical system unit 15 in which is disposed a light emitting element, such as a semiconductor laser, for forming a latent image on a photoconductive drum 37, and an image forming portion 16. The image forming portion 16 is formed of the photoconductive drum 37, a charging device 38, a developing device 39, a transfer charger 30, a stripping charger 31, a cleaner 32, a paper carrying mechanism 33 for carrying a sheet of paper P, and a fixing device 34, all of which are necessary to form an image by the electrophotographic process. A sheet of paper P on which is formed an image by the image forming portion 16 is discharged onto a paper discharge tray 36 via a paper discharge roller 35. Monochrome conversion processing for a color original document in the embodiment of the invention is also performed in the image processing portion 14. Details will be described below.

Figure 10:
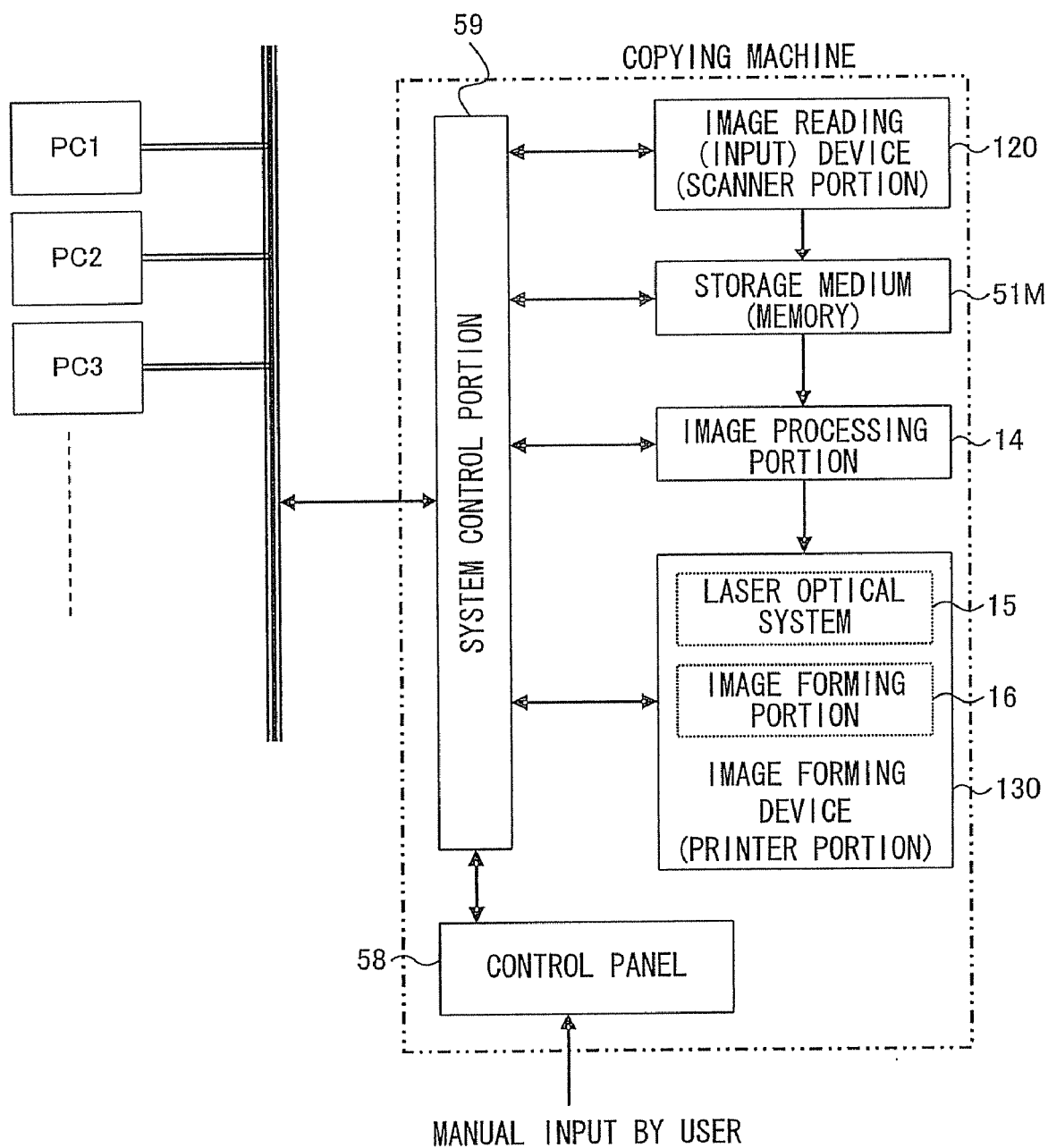
FIG. 10 is a block diagram showing the overall system of the copying machine shown in FIG. 9.

FIG. 10 is a block diagram schematically showing the overall system configuration of the image processing apparatus formed of the image reading device and the image forming device as is shown in FIG. 9. This system includes the scanner portion (image reading device) 120, a memory 51 formed of a recording medium, the image processing portion 14 that performs various kinds of image processing, a laser optical system 15 using a semiconductor laser, and the image forming portion 16 that forms an image using toner particles by the electrophotographic process, plus a system control portion 59 that controls the foregoing components and a control panel 58 through which the user directly makes an input. The laser optical system 15 and the image forming portion 16 together form the image forming device (printer portion) 130.

Herein, the image processing portion 14 corresponds to the image processing apparatus of the invention. In this embodiment, the image processing portion 14 and the image reading device (scanner portion) 120 are provided separately. It goes without saying, however, that it is possible to provide an image reading device formed of these components that are made into one piece, or it is possible to provide an image forming device in which the image processing portion 14 is provided integrally with the image forming device 130.

Figure 11:
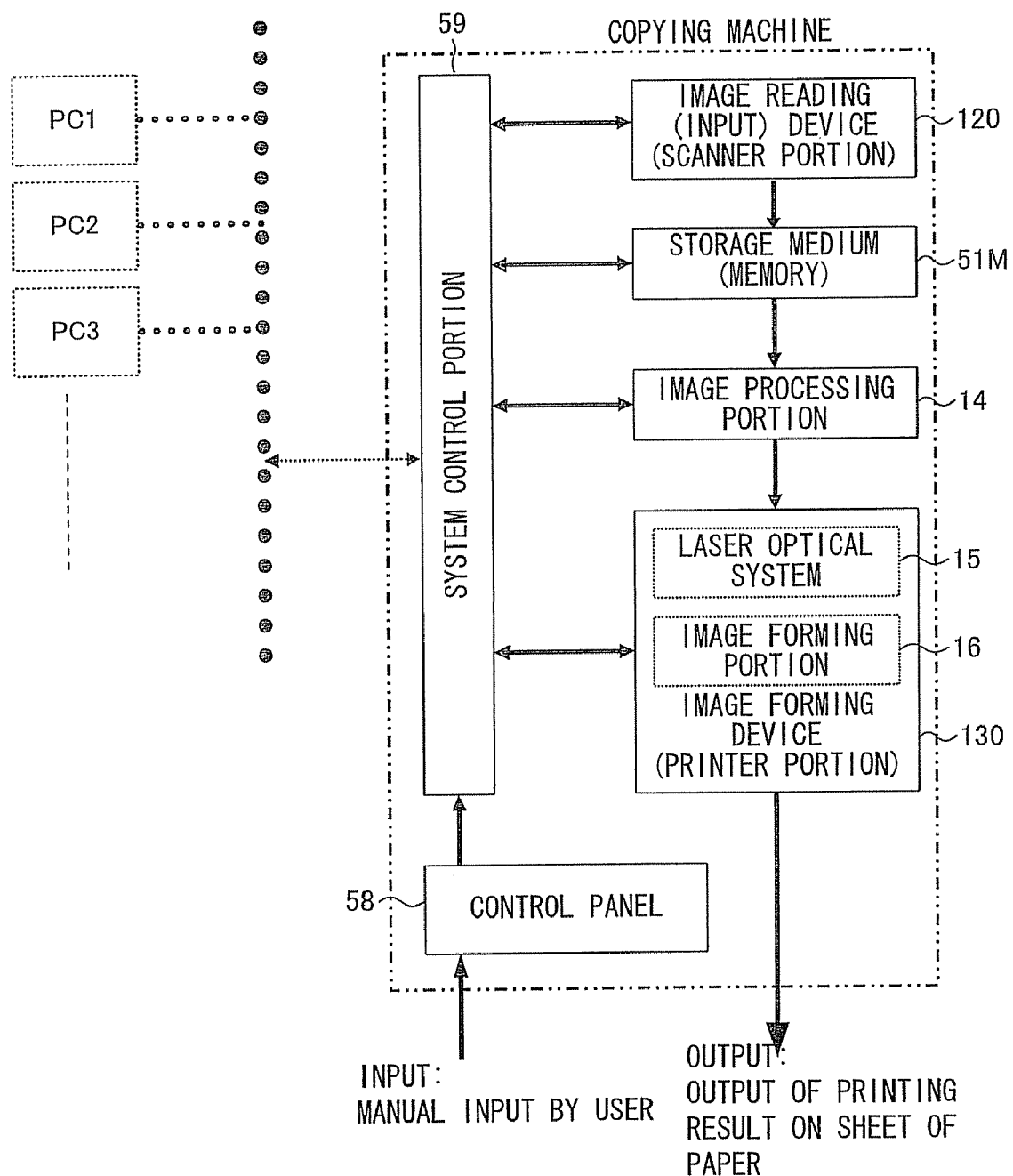
FIG. 11 is a block diagram used to describe a state where the copying machine is operating independently.
Figure 12:
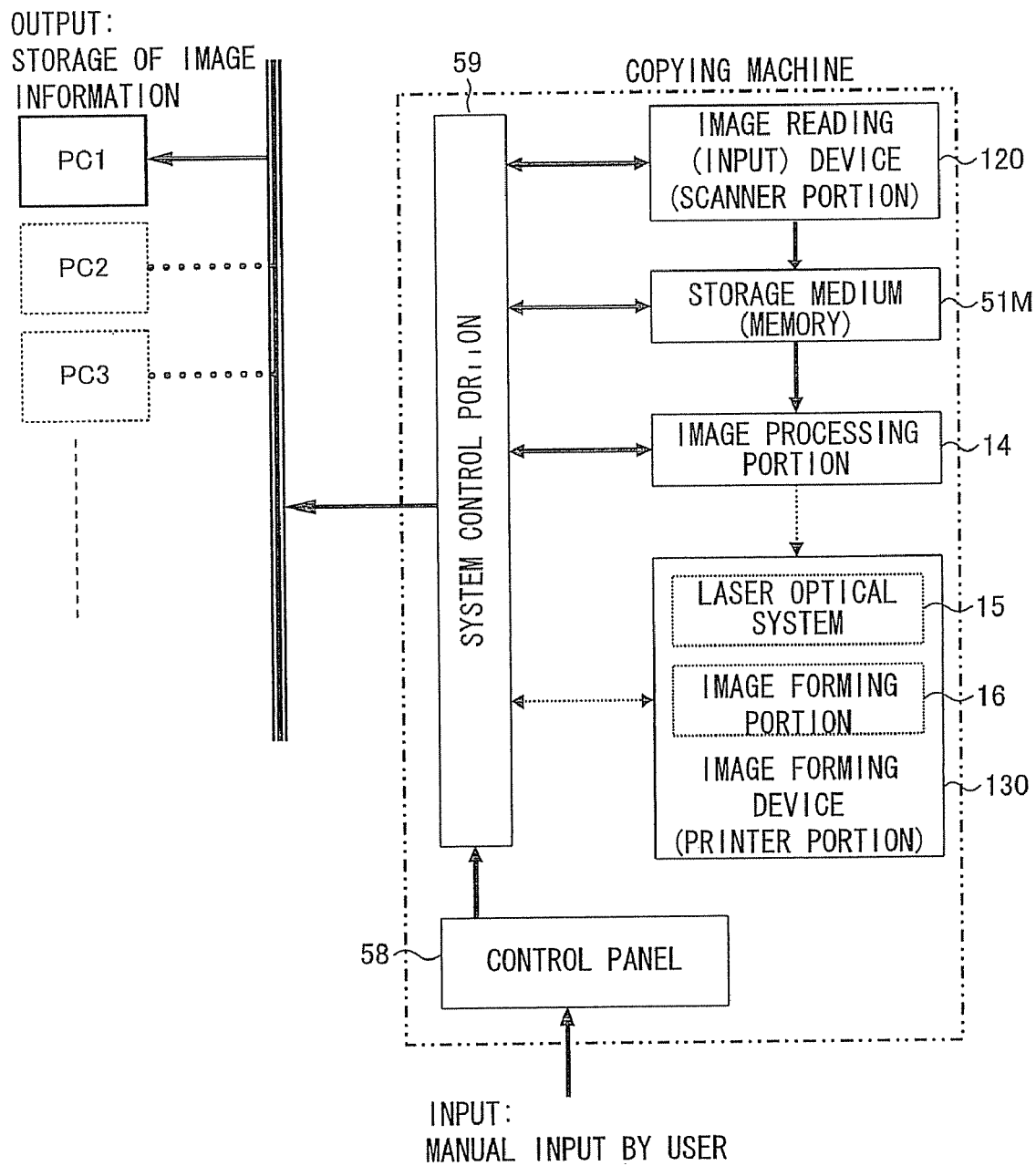
FIG. 12 is a block diagram used to describe a state where image information is read by a scanner portion serving as a network scanner, and the image information is outputted to a computer over a network connection via a system control portion.

FIG. 11 is an explanatory view in a case where the system of FIG. 10 is used as a copying machine. FIG. 12 is an explanatory view in a case where the system of FIG. 10 is connected to a network, so that it is used as a scanner by external computers PC1, PC2, PC3, and so forth.

Referring to FIG. 11, the apparatus is connected to the network via the system control portion 59; however, regarding the operations, it operates as a single unit of a copying machine. Initially, the user sets an original document org of which he wishes to make a copy on the scanner portion 120 serving as the image reading device, and performs desired settings from the control panel 58. The control panel 58 is formed of a copy and scanner button to make the setting as to whether the image processing apparatus is used as a copying machine to execute a copy job or it is used as the scanner serving as the image reading device, an original document mode specifying button to specify an original document mode, a display portion to display zooming up and down processing and the number of copies being set, key buttons to input a desired number of copies, a copy number set portion formed of a clear button to clear an input numerical value, a reset button to initialize the conditions set by the control panel, a stop button to abort a copy operation or a scanner operation, and a start button to start the copy operation or the scanner operation. The various set buttons on the control panel may be formed of, for example, a touch panel using liquid crystals, and used also as the display portion.

In the case described above, when the original document org is set, the document pressing cover 15 is closed, and the kind of the original document, the paper size to be outputted for the original document size, the number of copies to be made for one original document, and so forth are set using the control panel 58, after which the start button is depressed to start the copying operation. In this instance, the image information read by the scanner portion 120 is temporarily stored in the memory 51, which is a storage medium (device). The memory is formed of a page memory having a capacity larger than a capacity to store all the image information of the largest copy size available. An image signal outputted from the memory is subjected to processing, such as the filter processing and the tone processing, in the image processing portion 14, and converted to a control signal of the semiconductor laser, which is inputted into the laser optical system 15 at the latter stage. The image signal is converted to a light output of the semiconductor laser in the laser optical system 15, which is irradiated to the photoconductor 37 in the image forming portion 16. The image forming portion 16 then forms an image by the electrophotographic process.

An example of operations as the network scanner that outputs the image information read by the scanner portion 120 in the form of an image to a computer over the network connection via the system control portion 59 will now be described with reference to FIG. 12. The user sets the original document org in the scanner portion 120 and specifies the kind of the original document org, the size, and either the copy operation or the scanner operation using the control panel 58. Also, the user sets the address of a computer PC1 linked via the network as the destination of the image information, and the operation starts as the start button is depressed. The image information read by the scanner portion 120 is stored in the memory 51, and is later subjected to processing of this embodiment and, when the need arises, desired compression processing, such as the JPEG format and the PDF format, in the image processing portion 14 at the latter stage. The compressed image information is transferred to the external computer PC1 over the network via the system control portion 59.

Figure 13:
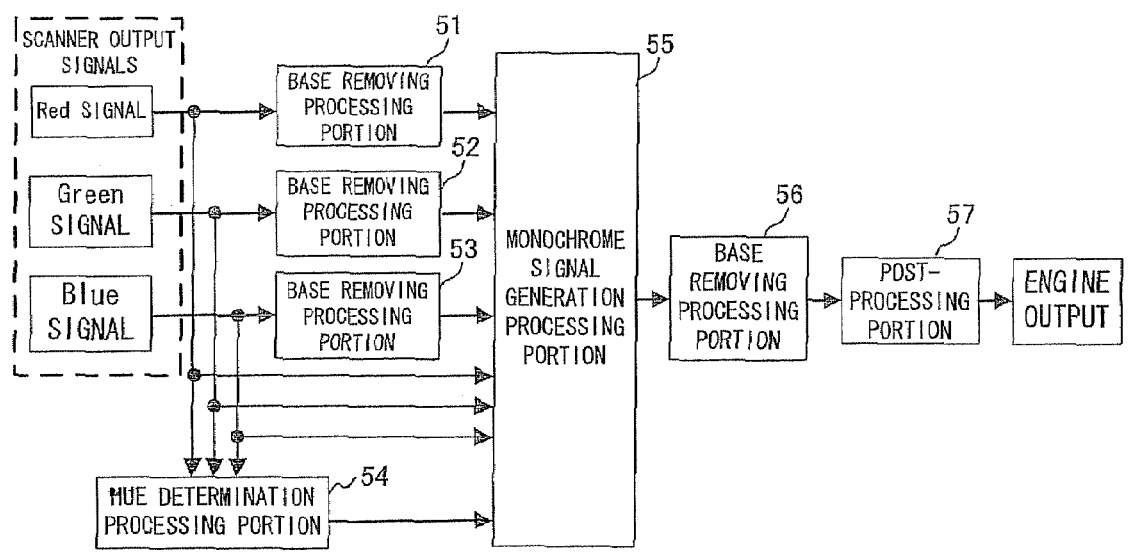
FIG. 13 is a block diagram showing the configuration of an image processing portion shown in FIG. 9.

The configuration of the image processing portion 14 in this embodiment will be described with reference to FIG. 13 and FIG. 14. Regarding the color signals (RGB signals) outputted from the scanner portion 120, the RGB signals are inputted, respectively, into base removing processing portions 51, 52, and 53 distinctively and independently (separately). The base removing processing 51, 52, and 53 calculate histogram for the signals inputted therein for every sub-scanning line, and calculate the signal value at the highest frequency as the white reference value. The base removing processing is performed by performing a re-normalizing computation using the white reference value thus calculated and the pre-set black reference value. The equation for the re-normalizing computation is as follows.

OUTimg=(INimg−black reference value)/(white reference value−black reference value)×255

Herein, OUTimg is an output signal for re-normalization and INimg is an input image signal.

Figure 14:
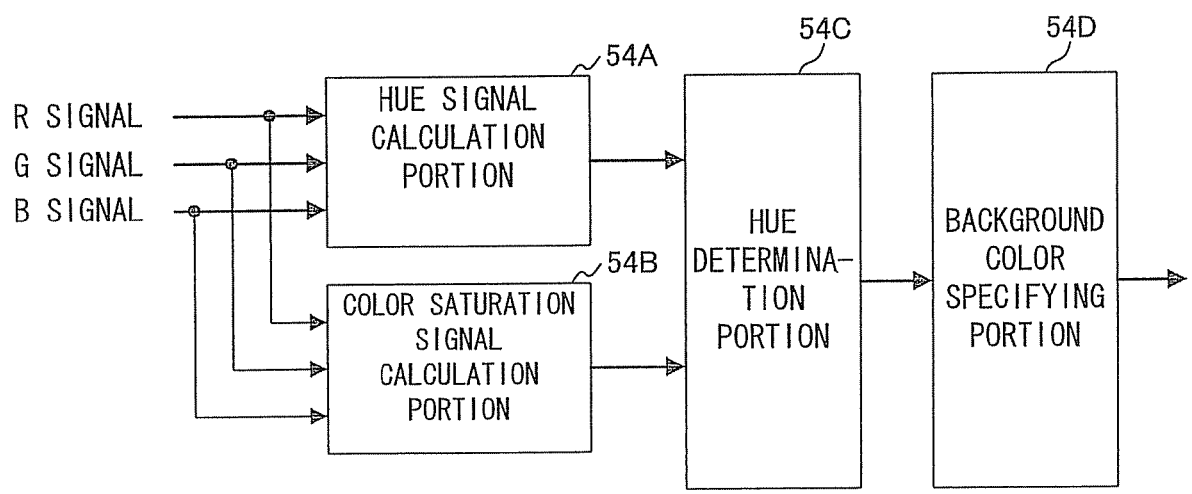
FIG. 14 is a block diagram showing the configuration of a hue determination processing portion shown in FIG. 13.

The hue determination processing portion 54 calculates hue and color saturation using the RGB signals as is shown in FIG. 14. To be more concrete, a hue signal and a color saturation signal are calculated using the equation below, respectively, in a hue signal calculation portion 54A and a color saturation calculation portion 54B from the RGB signals.

hue signal=tan$^{-1}$((R−G)/(G−B)*180)/π color saturation signal=Max(|R−G|,|G−B|).

Herein, Max(|R−G|, |G−B|) means that the absolute value of R−G and the absolute value of G−B are compared with each other to output whichever is the greater.

The hue is determined by a hue determination portion 54C from the hue and color saturation signals thus calculated. To be more concrete, the calculated color saturation signal is compared with a threshold value the and a density threshold value thd to determine whether the hue is a chromatic color, black, or white:

if color saturation signal<the and MAX(R, G, B)<thd, then the hue is black;

if color saturation signal<the and MAX(R, G, B)≧thd, then the hue is white; and if color saturation signal≧thc, then the hue is a chromatic color.

Figure 15:
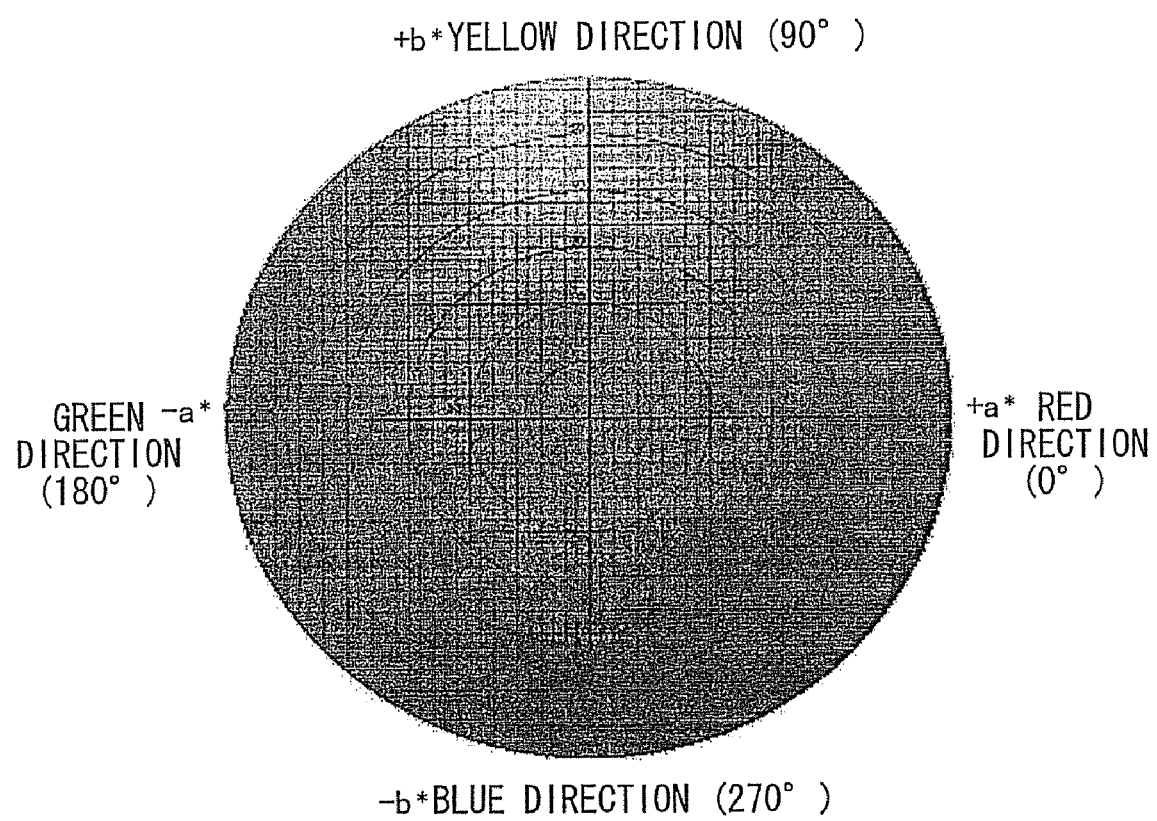
FIG. 15 is a view showing a hue circular disk used to determine hues.

In a case where the hue is found to be a chromatic color as the result of determination, the hue is determined using the hue signal. To be more concrete, as is shown in the hue circular disk of FIG. 15, the color signal can indicate the hue by the angles: given 0° as red, then yellow (about 90°), green (180°), and blue (270°). Hence, by comparing the hue signal thus found with the conditional equations below, it is possible to determine the hue.

Conditional Equations:

if hue signal≦thh1 or hue signal>thh6, then the hue is red;

if thh1<hue signal≦thh2, then the hue is yellow;

if thh2<signal≦thh3, then the hue is green;

if thh3<hue signal≦thh4, then the hue is cyan;

if thh4<hue signal≦thh5, then the hue is blue; and if thh5<hue signal≦thh6, then the hue is magenta.

The hue is determined pixel by pixel (every pixel of interest) on the basis of the determinations as above.

The hue results determined by the hue determination portion 54C are inputted into a background color specifying portion (background color specifying means) 54D. The background color specifying portion 54D calculates total frequencies of hues including black, red, yellow, green, cyan, blue, magenta, and white in a region of main scanning 7016 pixels× sub-scanning 3 lines (one line before and one line after the line being processed). The color forming the background of the line being processed is specified (determined) by comparing the total frequencies of the respective hues thus calculated with a specific threshold value. To be more concrete, the color is specified under the condition as follows.

Conditional Equations:

if a total frequency of black>bg_th1, then the black hue is the background;

if a total frequency of black≦bg_th1, then the black hue is not the background;

if a total frequency of red>bg_th2, then the red hue is the background; and if a total frequency of red≧bg_th2, then the red hue is not the background.

Threshold determination is performed for each of yellow, green, cyan, blue, magenta, and white in the same manner.

A monochrome signal generation processing portion (monochrome signal generation processing means) 55 (FIG. 13) generates a monochrome signal using the RGB signals outputted from the base removing processing portions 51, 52, and 53 (defined as rng_R, rng_G, and rng_B, respectively), the RGB signals outputted from the scanner portion 120, and the hue determination result of each pixel as a pixel of interest and the background color determination result by the unit of line outputted from the hue determination processing portion (hue determination means) 54. To be more concrete, a monochrome signal to be outputted is determined under the condition as follows.

| Hue result of pixel of interest | Background determination result | Monochrome output signal |
|---|---|---|
| Black | background | 255 − Max(rng_R, rng_G, rng_B) |
|  | non-background | 255 − Max(rng_R, rng_G, rng_B) |
| Red | background | 255 − rng_R |
|  | non-background | 255 − (G + B)/2 |
| Yellow | background | 255 − (rng_R + rng_G)/2 |
|  | non-background | 255 − B |
| Green | background | 255 − rng_G |
|  | non-background | 255 − (R + B)/2 |
| Cyan | background | 255 − (rng_G + rng_B)/2 |
|  | non-background | 255 − R |
| Blue | background | 255 − rng_B |
|  | non-background | 255 − (R + B)/2 |
| Magenta | background | 255 − (rng_G + rng_B)/2 |
|  | non-background | 255 − G |
| White | background | 255 − Min(R, G, B) |
|  | non-background | 255 − Min(R, G, B) |

Each monochrome output signal is subtracted from 255, and this subtraction is performed because white is indicated by "255" and black is indicated by "0" in the RGB signal system, whereas a monochrome signal indicates white as "0" and black as "255".

The reason why different RGB signals are used for the background and the non-background as described above is as follows, by way of example, in the case of the red hue. When a red original document is read, the RGB signals outputted from the scanner are red=255, green=0, and blue=0 in the ideal state. In the case of the background, when a red signal is used, the value of the background becomes "0" when converted to monochrome. In the case of the non-background, that is, in the case of characters, because it is necessary to output them in black when converted to monochrome, green and blue signals are used. Because the green and blue signals are "0", black becomes "255" when converted to monochrome. However, signals are never outputted in such an ideal state in the actual scanner. Hence, by using a signal having undergone the base removing processing for the hue determined as being the background, covering (assimilation of the non-background and the background) that occurs when converted to monochrome is suppressed.

As has been described, the monochrome signal generation processing portion 55 generates a monochrome signal using different RGB signals in cases where the background color and the pixel (pixel of interest) are the same and different. In the invention, the RGB signals used by the monochrome signal generation processing portion 55 when the background color and the pixel of interest are the same are referred to as first RGB signals, and the RGB signals used by the monochrome signal generation processing portion 55 when the background color and the pixel of interest are different are referred to as second RGB signals.

It is possible to further remove the background by performing the base removing processing by a base removing processing portion 56 (base removing means) for the signal converted to monochrome. The processing method of the base removing processing portion 56 is the same as that of the base removing processing portions 51, 52, and 53. A post-processing portion 57 performs the filter processing and the tone processing, such as the binary error diffusion, to a signal outputted from the base removing processing portion 56 and outputs the processing result to the circuit at the latter stage as the engine output. By performing the processing in this manner, it is possible to achieve an image having neither covering nor smearing as is shown in FIG. 16. In other words, an original color image shown in FIG. 16A is not printed clearly as is shown in FIG. 16B by an image processing apparatus in the related art. On the contrary, according to the image processing apparatus of the embodiment above, it is printed clearly as is shown in FIG. 16C.

Operations for monochrome correction processing during the copying operation and the network scanning operation in this embodiment will now be described. The basic configuration is the same as the copying operation described above. As with the copying operation, an image is generated by applying the background removing processing by the background removing processing portion 56 and the filter processing by the post-processing portion 57 to the RGB signals outputted from the scanner using a signal generated by the monochrome signal generation processing portion 55. Subsequently, unillustrated resolution conversion processing and compression processing are performed, after which the image data is outputted to a PC linked to the network. When configured in this manner, even when the apparatus is used as the network scanner, it is possible to achieve an image having neither covering nor smearing. As has been described, according to this embodiment, by generating a monochrome signal using any one of RGB signals by specifying the background color for an image read by the image reading device, it is possible to provide a high-quality image output having no image smearing.

What is claimed is:

1. An image processing apparatus, comprising:
a background color specifying unit configured to specify a background color of an original document using RGB signals of image data acquired by reading the original document;
a hue determination unit configured to determine a hue of a pixel in the image data; and
a monochrome signal generation processing unit configured to generate a monochrome signal using at least one of the RGB signals according to a specification result of the background color specifying unit and a determination result of the hue determination unit,
wherein, in the hue determination unit, if the hue is found to be a chromatic color, the hue is determined by comparing a hue signal with the conditional equations below:
if hue signal≦thh1 or hue signal>thh6, then the hue is red;
if thh1<hue signal≦thh2, then the hue is yellow;
if thh2<hue signal≦thh3, then the hue is green;
if thh3<hue signal≦thh4, then the hue is cyan;
if thh4<hue signal≦thh5, then the hue is blue; and
if thh5<hue signal≦thh6, then the hue is magenta, and
wherein the background color specifying unit calculates total frequencies of hues including black, red, yellow, green, cyan, blue, magenta, and white and compares the total frequencies of the respective hues with a specific threshold value using the conditional equations below:
if a total frequency of black>bg th1, then the black hue is the background;
if a total frequency of black≦bg th1, then the black hue is not the background;

if a total frequency of red>bg th2, then the red hue is the background;

if a total frequency of red ≦bg th2, then the red hue is not the background; and threshold determination is performed for each of yellow, green, cyan, blue, magenta, and white in the same manner.

2. The image processing apparatus according to claim 1, wherein:

the monochrome signal generation processing unit generates the monochrome signal using one or two of the RGB signals upon determination that the background color and the hue of the pixel are same according to the specification result of the background color specifying unit and the determination result of the hue determination unit.

3. The image processing apparatus according to claim 1, wherein:

the monochrome signal generation processing unit generates the monochrome signal using one or two of the RGB signals upon determination that the background color and the hue of the pixel are different according to the specification result of the background color specifying unit and the determination result of the hue determination unit.

4. The image processing apparatus according to claim 1, wherein:

the monochrome signal generation processing unit has a base removing processing unit configured to perform base removing processing on the RGB signals.

5. The image processing apparatus according to claim 1, wherein:

the monochrome signal generation processing unit further performs background removing processing on the monochrome signal generated.

6. The image processing apparatus according to claim 1, wherein:

the background color specifying unit and the hue determination unit specify at least eight colors including cyan, magenta, yellow, black, red, green, blue, and white.

7. The image processing apparatus according to claim 1, wherein:

the background color specifying unit refers to an area of main scanning M pixels and sub-scanning N pixels to calculate appearance frequencies of respective hues within the region from the determination result of the hue made pixel by pixel by the hue determination unit, and specifies a hue having a frequency as high as or higher than a specific threshold value as the background color.

8. The image processing apparatus according to claim 1, wherein:

the monochrome signal generation processing unit makes a discrimination of each hue determined for a pixel by the hue determination unit depending on whether the hue is same as the background color specified by the background specifying unit, and generates a monochrome output signal in accordance with a specific computation equation using the RGB signals as parameters for each discrimination.

9. An image processing apparatus, comprising:

background color specifying means for specifying a background color of an original document using RGB signals of image data acquired by reading the original document;

hue determination means for determining a hue of a pixel in the image data; and monochrome signal generation processing means for generating a monochrome signal using at least one of the RGB signals according to a specification result of the background color specifying means and a determination result of the hue determination means, wherein, in the hue determination means, if the hue is found to be a chromatic color, the hue is determined by comparing a hue signal with the conditional equations below:

if hue signal≦thh1 or hue signal>thh6, then the hue is red;
if thh1<hue signal≦thh2, then the hue is yellow;
if thh2<hue signal≦thh3, then the hue is green;
if thh3<hue signal≦thh4, then the hue is cyan;
if thh4<hue signal≦thh5, then the hue is blue; and
if thh5<hue signal≦thh6, then the hue is magenta, and wherein the background color specifying unit calculates total frequencies of hues including black, red, yellow, green, cyan, blue, magenta, and white and compares the total frequencies of the respective hues with a specific threshold value using the conditional equations below:

if a total frequency of black>bg th1, then the black hue is the background;

if a total frequency of black≦bg th1, then the black hue is not the background;

if a total frequency of red>bg th2, then the red hue is the background;

if a total frequency of red ≦bg th2, then the red hue is not the background;

threshold determination is performed for each of yellow, green, cyan, blue, magenta, and white in the same manner.

10. The image processing apparatus according to claim 9, wherein:

the monochrome signal generation processing means generates the monochrome signal using one or two of the RGB signals upon determination that the background color and the hue of the pixel are same according to the specification result of the background color specifying means and the determination result of the hue determination means.

11. The image processing apparatus according to claim 9, wherein:

the monochrome signal generation processing means generates the monochrome signal using one or two of the RGB signals upon determination that the background color and the hue of the pixel are different according to the specification result of the background color specifying means and the determination result of the hue determination means.

12. The image processing apparatus according to claim 9, wherein:

the monochrome signal generation processing means has base removing processing means for performing base removing processing on the RGB signals.

13. The image processing apparatus according to claim 9, wherein:

the monochrome signal generation processing means further performs background removing processing on the monochrome signal generated.

14. The image processing apparatus according to claim 9, wherein:

the background color specifying means and the hue determination means specify at least eight colors including cyan, magenta, yellow, black, red, green, blue, and white.

15. The image processing apparatus according to claim 9, wherein:

the background color specifying means refers to an area of main scanning M pixels and sub-scanning N pixels to calculate appearance frequencies of respective hues within the region from the determination result of the hue made pixel by pixel by the hue determination means, and specifies a hue having a frequency as high as or higher than a specific threshold value as the background color.

16. An image processing method performed by a computer in an image processing apparatus, comprising the steps of:

specifying a background color of an original document using RGB signals of image data acquired by reading the original document;

determining a hue of a pixel in the image data; and generating a monochrome signal using at least one of the FGB signals according to a specification result in the step of specifying the background color and a determination result in the step of determining the hue, wherein, in the determining the hue, if the hue is found to be a chromatic color, the hue is determined by comparing a hue signal with the conditional equations below:

if hue signal$\leqq$thh1 or hue signal>thh6, then the hue is red;
if thh1<hue signal$\leqq$thh2, then the hue is yellow;
if thh2<hue signal$\leqq$thh3, then the hue is green;
if thh3<hue signal$\leqq$thh4, then the hue is cyan;
if thh4<hue signal$\leqq$thh5, then the hue is blue; and
if thh5<hue signal$\leqq$thh6, then the hue is magenta, and wherein, in the specifying the background color, total frequencies of hues including black, red, yellow, green, cyan, blue, magenta, and white are calculated and the total frequencies of the respective hues are compared with a specific threshold value using the conditional equations below if a total frequency of black>bg th1, then the black hue is the background;

if a total frequency of black$\leqq$bg th1, then the black hue is not the background;

if a total frequency of red>bg th2, then the red hue is the background;

if a total frequency of red $\leqq$bg th2, then the red hue is not the background;

threshold determination is performed for each of yellow, green, cyan, blue, magenta, and white in the same manner.

* * * * *